(12) United States Patent
Stephenne (10) Patent No.: US 10,389,476 B2
(45) Date of Patent: Aug. 20, 2019

(54) METHODS AND DEVICES FOR ADDRESSING PASSIVE INTERMODULATION IN WIRELESS COMMUNICATION

(71) Applicant: Telefonaktiebolaget LM Ericsson (publ), Stockholm (SE)

(72) Inventor: Alex Stephenne, Stittsville (CA)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 15/777,024

(22) PCT Filed: Dec. 1, 2015

(86) PCT No.: PCT/IB2015/059262
§ 371 (c)(1),
(2) Date: May 17, 2018

(87) PCT Pub. No.: WO2017/093784
PCT Pub. Date: Jun. 8, 2017

(65) Prior Publication Data
US 2018/0359048 A1     Dec. 13, 2018

(51) Int. Cl.
*H04L 1/00*     (2006.01)
*H04W 72/12*    (2009.01)

(52) U.S. Cl.
CPC .......... *H04L 1/0004* (2013.01); *H04L 1/0002* (2013.01); *H04L 1/0009* (2013.01);
(Continued)

(58) Field of Classification Search
CPC ..... H04L 1/0004; H04L 1/0033; H04L 27/18; H04L 27/0008; H04L 27/2035;
(Continued)

(56) References Cited

U.S. PATENT DOCUMENTS

2013/0044621 A1   2/2013  Jung et al.
2013/0115997 A1   5/2013  Immonen et al.
(Continued)

OTHER PUBLICATIONS

International Search Report and Written Opinion of the International Searching Authority dated Oct. 4, 2016 issued in corresponding PCT Application Serial No. PCT/IB2015/059262, consisting of 20 pages.
(Continued)

Primary Examiner — Ted M Wang
(74) Attorney, Agent, or Firm — Sage Patent Group (57) ABSTRACT

Methods and devices for PIM-aware link adaptation are disclosed. According to some aspects, a network node and a method for link adaptation that accounts for passive intermodulation (PIM) at the network node of a wireless communication system are disclosed. A PIM power spectral density (PSD) versus the set of receive frequencies is determined based on at least one transmission frequency of a set of transmission frequencies at at least one antenna. Link adaptation is performed based on the PIM PSD versus a set of receive frequencies. Performing the link adaptation includes choosing at least one transmission parameter of a transmitter scheduled to transmit on a frequency among the set of receive frequencies.

33 Claims, 8 Drawing Sheets

(52) U.S. Cl.
CPC .......... *H04L 1/0033* (2013.01); *H04L 1/0036* (2013.01); *H04W 72/1263* (2013.01)

(58) Field of Classification Search
CPC ............. H04L 25/03834; H04L 1/0002; H04L 1/0036; H04L 1/0009; H04B 1/707; H04W 72/1263
See application file for complete search history.

(56) References Cited

U.S. PATENT DOCUMENTS

| | | |
|---|---|---|
| 2013/0242939 A1 | 9/2013 | Wagner |
| 2014/0269849 A1* | 9/2014 | Abdelmonem ....... H04L 5/0026 375/148 |
| 2015/0139009 A1 | 5/2015 | Park et al. |
| 2016/0301436 A1* | 10/2016 | Zou ........................ H04B 1/525 |

OTHER PUBLICATIONS

Invitation to Pay Additional Fees and, Where Applicable, Protest Fee dated Aug. 9, 2016 issued in corresponding PCT Application Serial No. PCT/IB2015/059262, consisting of 7 pages.

* cited by examiner (Prior Art)
FIG. 1

METHODS AND DEVICES FOR ADDRESSING PASSIVE INTERMODULATION IN WIRELESS COMMUNICATION

CROSS-REFERENCE TO RELATED APPLICATIONS

This application is a Submission Under 35 U.S.C. § 371 for U.S. National Stage Patent Application of International Application Number: PCT/IB2015/059262, filed Dec. 1, 2015entitled "METHODS AND DEVICES FOR ADDRESSING PASSIVE INTERMODULATION IN WIRELESS COMMUNICATION" which is incorporated herein by reference.

TECHNICAL FIELD

The present disclosure pertains to wireless communications and in particular to passive intermodulation (PIM).

BACKGROUND

In a wireless communication system, passive intermodulation (PIM) is a form of intermodulation distortion that occurs in components of a base station normally thought of as linear, such as cables, connectors, and antennas. However, when subject to high radio frequency (RF) powers, as found in cellular systems, these devices can generate spurious signals. PIM appears as a set of unwanted signals created by the mixing of two or more strong RF signals in a non-linear device, such as in a loose or corroded connector, or in nearby rust. Other names for PIM include the diode effect and the rusty bolt effect.

Figure 1:
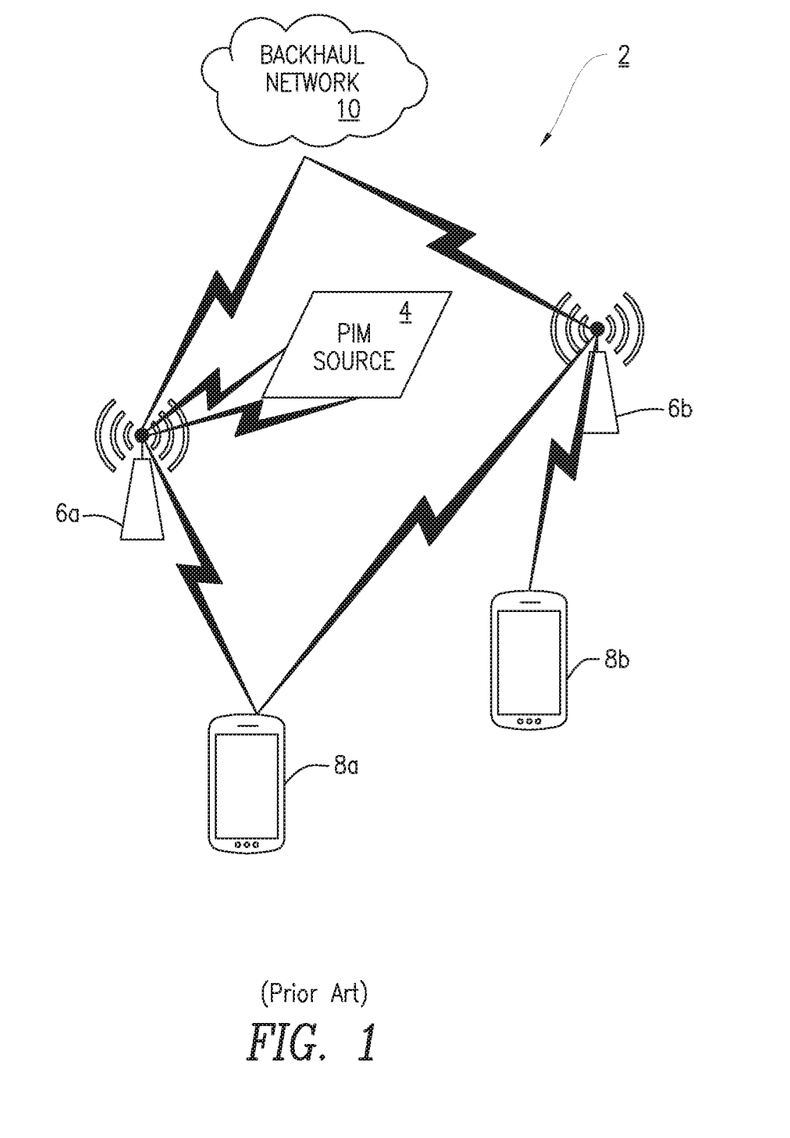
FIG. 1 is a block diagram of a known wireless communication system having a PIM source.

FIG. 1 is a block diagram of a portion of a wireless communication system having a PIM source 4, and base stations 6a and 6b, referred to collectively herein as base stations 6. The base stations 6 are in communication with one or more wireless devices 8a and 8b, referred to collectively herein as wireless devices 8. The base stations 6 are also in communication with a backhaul network 10. The PIM source 4 may be located at or near a base station 6a. For example, the base station 6a may transmit a signal on the downlink which interacts with the PIM source 4 to produce PIM at a frequency that is within a band of receive signals received by the base station 6a, interfering with one or more desired receive signals.

Some frequencies at which PIM may occur can be predicted by the formulas, nF1−mF2, nF2−mF1, where F1 and F2 are carrier frequencies and the constants n and m are positive integers. When referring to PIM products, the sum of n+m is called the product order, so if m is 2 and n is 1, the result (2+1=3) is referred to as a third order product. Typically, the third order product is the strongest, causing the most harm, followed by the fifth and seventh order products, which can also cause significant harm. Because PIM amplitude becomes lower as the order increases, higher order products typically are not strong enough to cause direct frequency problems, but they usually assist in raising the adjacent noise floor. Note also that PIM may be generated by signals transmitted on a single transmit frequency F1 that is modulated in different ways and transmitted on two or more antennas, for example, when beamforming is implemented in the communication network.

Frequency planning for cellular systems is performed to make sure that the uplink and downlink frequency used at a given network node are separated adequately in frequency (for frequency division duplex (FDD) systems) and/or in time (for time division duplex (TDD) systems). This ensures that there exists a frequency separation between the downlink and uplink bands used at the same time and place. Without such planning, the high power transmit (TX) signal will interfere with the typically much lower power receive (RX) signal at the network node, e.g., base station. The result is referred to as self-interference. When a network node or adjacent nodes use multiple bands, the frequency planning should also consider not only the direct RX/TX frequency bands, but also possible PIM distortions occurring in the RX band that are generated by signals transmitted in the TX band, especially the third order PIM product. With the continually increasing need for higher bandwidth, operators are led to use multiple bands. For some band combinations, uplink transmissions on certain frequency sub-bands might start to be impacted by the intermodulation associated with the downlink transmissions over multiple sub-bands.

To reduce PIM, the network node site may be cleaned to prevent the rusty bolt effect, and the radio components such as cables may be chosen to minimize PIM. Even then, full control of the environment to avoid PIM is not always possible or practical.

Link adaptation is used to match modulation, coding and other signal and protocol parameters to the conditions on a radio link in an effort to maximize data throughput for a given set of radio link conditions. Coordinated link adaptation (CoLA) is a technique that includes sharing (or predicting) scheduling information among cells or network nodes using the same frequencies, such that some form of interference prediction for future transmissions presently scheduled is enabled as part of the link adaptation process. This prediction at scheduling time allows for a better tuning of the link adaptation and for higher throughput. Typically, the predicted instantaneous signal to interference plus noise ratio (SINR) estimate is used to select the most appropriate modulation and coding scheme (MCS). This is called the inner loop of the link adaptation.

With respect to link adaptation, in operation, if the SINR decreases, a lower order of modulation and coding may be selected and, conversely, if the SINR increases, a higher order of modulation and coding may be selected. Any bias in the SINR estimate of the inner loop is compensated by an outer loop of the link adaptation. This outer loop iteratively computes a SINR de-biasing parameter based on, for example, the acknowledgement or non-acknowledgement of correctly decoded transmitted cyclic redundancy check (CRC) data. Based on the SINR de-biasing parameter, the selected MCS may increase or decrease. An example of coordinated link adaptation, in the downlink (DL) of cellular wireless communication systems, is to share DL scheduling information between cells, keep the inner loop unchanged, but use multiple outer loops, which may be selected appropriately based on the knowledge of the scheduling activity (proper combination of active interfering cells) on the same frequency in the adjacent cells.

SUMMARY

Sharing of DL scheduling information is used in coordinated downlink link adaptation and sharing of uplink (UL) scheduling information is used for coordinated uplink link adaptation. Currently, coordinated link adaptation is not PIM-aware and is therefore not utilized to address or consider the presence of PIM.

Some embodiments advantageously provide a method and network node for PIM-aware link adaptation. According to one aspect, a method for link adaptation that accounts for passive intermodulation, PIM, at a network node of a wireless communication system is provided, where the network node has a first transmitter configured to generate first transmissions at a set of transmission frequencies at at least one antenna and has a receiver configured to receive signals at a set of receive frequencies. The method includes determining, based on at least one transmission frequency of the set of transmission frequencies at at least one antenna, a PIM power spectral density (PSD) versus the set of receive frequencies. The method includes performing link adaptation based on the PIM PSD versus the set of receive frequencies. Performing the link adaptation includes choosing at least one transmission parameter of a second transmitter scheduled to transmit on a frequency among the set of receive frequencies.

According to this aspect, in some embodiments, determining the PIM PSD versus the set of receive frequencies is based on processing a power spectral density of at least one of the at least one transmission frequency at the at least one antenna. In some embodiments, determining PIM PSD versus the set of receive frequencies is based on processing I and Q signals of at least one of the at least one transmission frequencies. In some embodiments, the chosen at least one transmission parameter includes an SINR back off factor associated with an order of modulation and coding of a signal at a frequency among the set of receive frequencies. In some embodiments, determining PIM PSD versus the set of receive frequencies includes accessing a look up table that maps activity on at least one transmission frequency to a set of pre-calculated PIM levels at the set of receive frequencies.

In some embodiments, determining the PIM PSD versus the set of receive frequencies includes further comprises determining whether PIM magnitude at a receive frequency is one of a high PIM exceeding a threshold and a low PIM falling below the threshold. In some embodiments, a first link adaptation state is based on high PIM exceeding a threshold and a second link adaptation state is based on low PIM falling below the threshold. In some embodiments, significant PIM-inducing elements are determined to be absent when the first link adaptation state converges to a similar transmission parameter as the second link adaptation state.

In some embodiments, determining PIM PSD versus the set of receive frequencies further comprises quantizing a predicted PIM power at a frequency at which PIM may occur to one of N levels, N being greater than two. In some embodiments, the method further includes performing a link adaptation for each of the N levels. In some embodiments, significant PIM-inducing elements are determined to be absent when link adaptation for each of the N levels converge to similar transmission parameters. In some embodiments, the method further includes performing a second link adaptation based on interference from another network node. In some embodiments, the link adaptation is performed by a link adaptation branch that includes an outer loop link adaptation based on adjusting a target interference plus noise ratio, SINR, based on historical detections of acknowledgments and non-acknowledgements of a receive signal. In some embodiments, a link adaptation branch includes an inner loop link adaptation based on an estimate of PIM interference in a channel at a receive frequency.

According to another aspect, a network node configured to perform link adaptation that accounts for PIM is provided, where the network node has a first transmitter configured to generate first transmissions at a set of transmission frequencies at at least one antenna and has a receiver configured to receive signals at a set of receive frequencies. The network node includes processing circuitry configured to determine, based on at least one transmission frequency of the set of transmission frequencies at at least one antenna, a PIM PSD versus the set of receive frequencies. The processing circuitry is also configured to perform link adaptation based on the PIM PSD versus the set of receive frequencies. Performing the link adaptation includes choosing at least one transmission parameter of a second transmitter scheduled to transmit on a frequency among the set of receive frequencies.

According to this aspect, in some embodiments, determining the PIM PSD versus the set of receive frequencies is based on processing a power spectral density of at least one of the at least one transmission frequency at the at least one antenna. In some embodiments, determining PIM PSD versus the set of receive frequencies is based on processing I and Q signals of at least one of the at least one transmission frequencies. In some embodiments, the chosen at least one transmission parameter includes an SINR backoff factor associated with an order of modulation and coding of a signal at a frequency among the receive frequencies. In some embodiments, determining the PIM PSD versus the set of receive frequencies includes accessing a look up table that maps activity (e.g. power allocation) on the at least one transmission frequency to a set of pre-calculated PIM levels at the set of a receive frequencies.

In some embodiments, determining the PIM PSD versus the set of receive frequencies further comprises determining whether PIM at each of the receive frequencies is one of high PIM exceeding a threshold and low PIM falling below the threshold. In some embodiments, a first link adaptation state is based on high PIM exceeding a threshold and a second link adaptation state is based on low PIM falling below the threshold. In some embodiments, significant PIM-inducing elements are determined to be absent when the first link adaptation state converges to a similar transmission parameter as the second link adaptation state.

In some embodiments, determining PIM PSD versus the set of receive frequencies further comprises quantizing a predicted PIM power at a frequency among the set of receive frequencies to one of N levels, N being greater than two. In some embodiments, the processing circuitry is further configured to perform a link adaptation for each of the N levels. In some embodiments, the processing circuitry is further configured to perform a second link adaptation based on interference from another network node. In some embodiments, the link adaptation is performed by a link adaptation branch that includes an outer loop link adaptation based on adjusting a target interference plus noise ratio, SINR, based on historical detections of acknowledgements and non-acknowledgements of a receive signal. In some embodiments, a link adaptation branch includes an inner loop link adaptation based on an estimate of PIM interference in a channel at a receive frequency. In some embodiments, the processing circuitry is further configured to: determine, based on at least one transmission frequency from another network node, a second PIM PSD versus the set of receive frequencies and performing an outer link adaptation based on the second PIM PSD.

According to yet another aspect, a network node configured to perform link adaptation to compensate for PIM is provided. The network node has a first transmitter configured to generate first transmissions at a set of transmission frequencies at at least one antenna and has a receiver configured to receive signals at a set of receive frequencies.

The network node includes a PIM determiner module configured to determine, based on at least one transmission frequency of the set of transmission frequencies, a PIM power spectral density versus the set of receive frequencies. The network node also includes a link adaptation module configured to perform link adaptation based on the PIM PSD versus the set of receive frequencies. Performing the link adaptation includes choosing at least one transmission parameter of a second transmitter scheduled to transmit on a frequency among the set of receive frequencies.

According to this aspect, in some embodiments, determining PIM PSD versus the set of receive frequencies is based on processing a power spectral density of at least one of the at least one transmission frequency at the at least one antenna. In some embodiments, the chosen at least one transmission parameter includes an SINR backoff factor associated with an order of modulation and coding of a signal at a frequency among the set of receive frequencies. In some embodiments, determining PIM PSD versus the set of receive frequencies further comprises determining whether PIM at each one of the receive frequencies is one of high PIM exceeding a threshold and low PIM falling below the threshold. In some embodiments, a first link adaptation state is based on high PIM exceeding a threshold and a second link adaptation state is based on low PIM falling below the threshold and determined at a second frequency among the set of receive frequencies. In some embodiments, significant PIM-inducing elements are determined to be absent when the first link adaptation converges to a similar transmission parameter as the second link adaptation.

According to another aspect, some embodiments include a method for link adaptation using a server node that accounts for passive intermodulation, PIM, at at least one network node of a wireless communication system, where the at least one network node has a first transmitter configured to generate transmissions at a first set of frequencies at at least one antenna of the network node, and where the at least one network node also has a receiver configured to receive signals at a set of receive frequencies. The method includes using the server node to determine, based on at least one transmission frequency of the generated transmission frequencies, a PIM power spectral density, PSD, versus a set of receive frequencies. The method further includes using the server node to determine link adaptation parameters based on the PIM PSD versus the set of receive frequencies, determining link adaptation parameters including choosing at least one transmission parameter of a second transmitter scheduled to transmit on a frequency among the set of receive frequencies.

According to yet another aspect, some embodiments include a server node configured to determine link adaptation parameters that account for passive intermodulation, PIM, at at least one network node of a wireless communication system, where the at least one network node has a first transmitter configured to generate transmissions at a first set of frequencies at at least one antenna of the network node, and where the at least one network node also has a receiver configured to receive signals at a set of receive frequencies. The server node includes processing circuitry configured to determine, based on at least one transmission frequency of the generated transmission frequencies, a PIM power spectral density, PSD, versus a set of receive frequencies. The processing circuitry is further configured to determine link adaptation parameters based on the PIM PSD versus the set of receive frequencies. Determining the link adaptation parameters includes choosing at least one transmission parameter of a second transmitter scheduled to transmit on a frequency among the set of receive frequencies.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Before describing in detail exemplary embodiments, it is noted that the embodiments reside primarily in combinations of apparatus components and processing steps related to passive intermodulation (PIM)-aware coordinated link adaptation (CoLA). Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

As used herein, depending on context, the term PIM may refer to the PIM effect, i.e., occurrence of PIM associated distortion, or to a magnitude (or amplitude, or size, or level etc.) of the PIM effect. For the latter case, the terms PIM magnitude, PIM amplitude, PIM level, PIM size, or simply PIM may be used interchangeably.

In some embodiments, PIM aware coordinated link adaptation is implemented. In a PIM-aware network node, as discussed herein, frequencies at which PIM may occur among receive frequencies of the network node are determined based on some signaling activity (e.g. power allocation) on at least one transmit frequency of the network node. In some embodiments, the signals to be transmitted by the network node are processed to generate a PIM power spectral density (PSD) having PIM amplitudes as a function of receive frequency. The generated PIM PSD may be quantized at multiple levels, such as two levels or N levels where N is greater than 2. From the generated PIM PSD, the frequencies at which significant PIM may occur among the receive frequencies of the network node are determined. A link adaptation is performed at at least one frequency at which PIM may occur among the receive frequencies. The link adaptation may result in choosing a transmission parameter such as signal to interference plus noise ratio (SINR) backoff factor associated with, e.g., used to select, a modulation and coding scheme (MCS) that achieves improved throughput in the presence of the PIM as compared with not considering PIM at all.

PIM at a base station, such as a Long Term Evolution (LTE) eNB is uplink (UL) self-interference generated from downlink (DL) transmitted signals in multiple bands. As such, for PIM mitigation, sharing of DL scheduling information between bands in the same or different eNBs/cells is needed to modify the uplink link adaptation for the mitigation of PIM effects at the base station receiver.

Some embodiments of the present disclosure may be applied at the wireless device, such as a user equipment (UE) in LTE. In such embodiments, PIM at the mobile device is downlink self-interference generated from uplink transmitted signals in multiple bands. As such, for PIM mitigation, sharing of UL scheduling information between bands in the same or different UEs (nearby) is used to modify the downlink link adaptation for the mitigation of PIM effects at the UE receiver.

Figure 2:
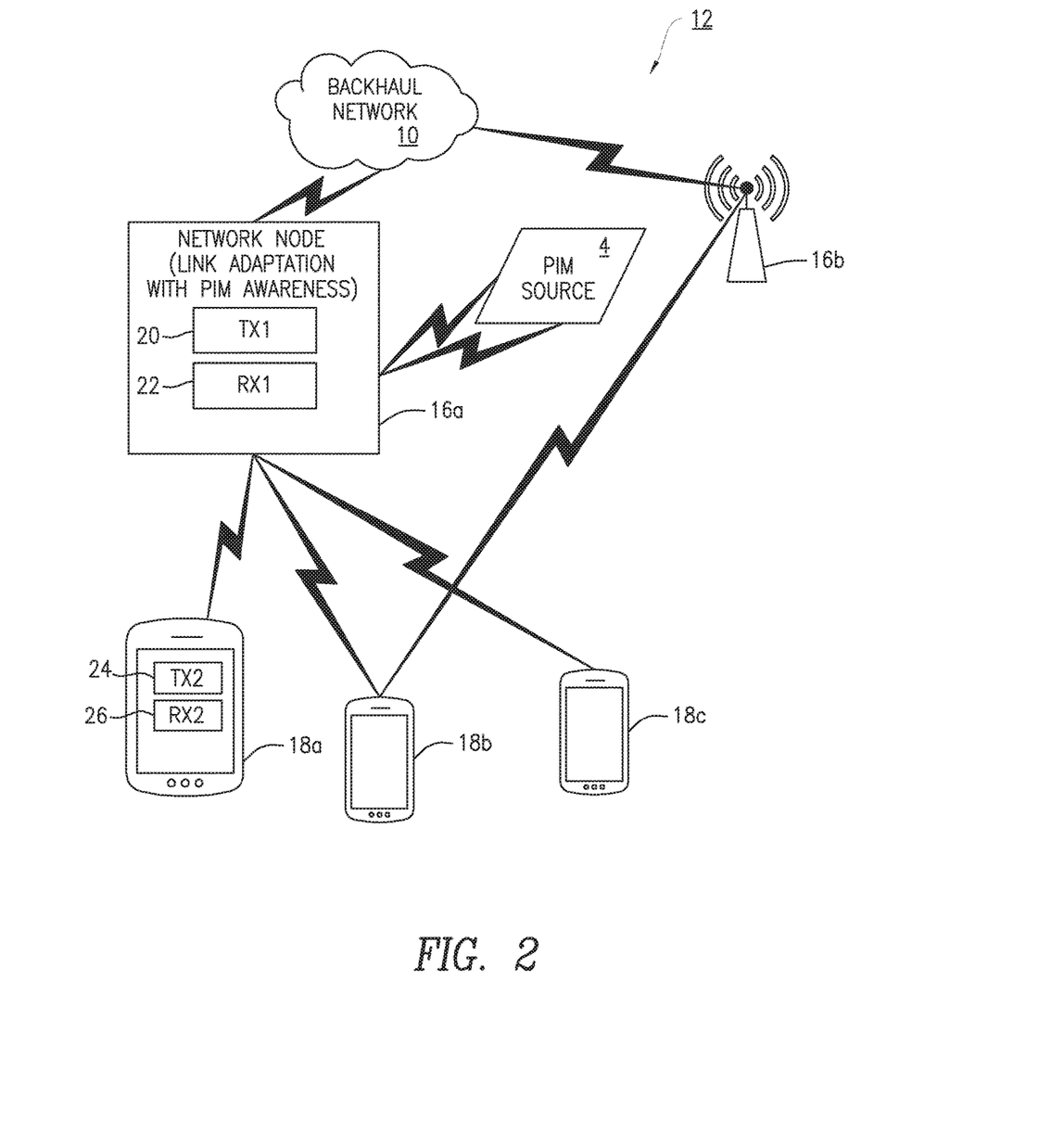
FIG. 2 is a block diagram of a wireless communication system having at least one network node implementing PIM-aware link adaptation.

FIG. 2 shows a portion of a wireless communication system 12 having base stations 16a and 16b, referred to collectively herein as base stations 16, and wireless devices 18a, 18b, and 18c, referred to collectively herein as wireless devices 18. Although FIG. 2 shows two base stations 16 and three wireless devices 18, it is understood that implementations are not limited to the quantities shown in FIG. 2. More or fewer base stations 16 and wireless devices 18 can be used. At least one of the base stations 16, such as base station 16a, performs link adaptation with PIM awareness. At least one of the wireless devices 18, such as wireless device 18a, may also perform link adaptation with PIM awareness.

Base stations 16, wireless devices 18 or other nodes interacting with the network or parts of the network may be referred to as network nodes. In other words a network node, as that term is used herein, may be a base station 16, a wireless device 18 or another node, such as a server. Further, PIM aware coordinated link adaptation implementation is not limited solely to base stations, e.g., eNodeBs in long term evolution (LTE) networks. It is contemplated that the principles and implementations described herein can be applied to wireless devices or other nodes in the network. Thus, any descriptions regarding PIM aware coordinated link adaptation with respect to transmitters and receivers in base stations, such as a base station 16 are applicable to transmitters and receivers in wireless devices 18. A wireless device 18 may be, but is not limited to, a user equipment (UE), mobile phone, smart phone, laptop computer, i-pad, tablet computer, desktop computer or other portable or mobile device capable of wireless communication.

The base station 16a includes a transmitter 20 and a receiver 22. The wireless device 18a has a transmitter 24 and a receiver 26. The transmitter 20 transmits one or more downlink signals at one or more transmit frequencies. These transmit frequencies may interact with components of the base station 16a or nearby objects such as rust, to produce PIM at frequencies at which the receiver 22 is tuned to receive. When a wireless device 18a transmits to the base station 16a at or near a PIM frequency, the PIM generated at the base station 16a may interfere with reception of the signal transmitted by the transmitter 24 of the wireless device 18a. In addition to PIM due to transmission at one or more transmit frequencies by one or more antennas of the base station having the receivers receiving PIM signals, PIM may also result from transmitters of other base stations that are in close proximity to the receivers. Thus, a cell site may include several transceivers and antenna groups associated with several base stations or cells, each contributing to PIM at one or more receivers of the transceivers.

The wireless device 18a has a transmitter 24 that transmits at signals that may be at receive frequencies of the base station 16a at which PIM is present. Also, a signal transmitted by the transmitter 24 may interact with a PIM source at the wireless device 18a to generate PIM at a frequency at or near a frequency at which the receiver 26 of the wireless device 18a is tuned to receive.

In either or both of the base station 16a and the wireless device 18a or even a network node other than a base station 16 or wireless device 18, e.g. a server, PIM may be addressed using coordinated outer loop link adaptation. Note that a server node configured to perform CoLA functions may be separate from or include a base station, and may also be distributed over several distinct network nodes. In an exemplary process, a network node may transmit at one or more transmission frequencies at one or more antennas. For example, a transmitter of the network node may transmit a first signal at a frequency F1 at a first antenna and may transmit a second signal at the frequency F1 at a second antenna. This may be done in the case of beamforming, for example.

Also, the network node may transmit first and second signals at different transmit frequencies F1 and F2. The first and second signals may interact with a PIM source to produce PIM at a plurality of frequencies at or near receive frequencies to which a receiver of the network node is tuned. In practice, the transmitter 20 of a base station 16 will transmit multiple signals at multiple frequencies on multiple antennas. The frequencies at which significant PIM may occur may depend on all of these multiple transmit signals, i. e. (signaling) activity (such as power allocation) on possible transmission frequencies, but in some embodiments, only some of these signals are employed to determine frequencies at which significant PIM may occur among the receive frequencies.

Thus, the frequencies at which significant PIM may occur among the network node's receive frequencies may be predicted based on knowledge of the one or more signals transmitted by the transmitter of the network node. For example, in some embodiments. I and Q channels of each of one or more complex signals to be transmitted at one or more antennas may be processed to predict the frequencies at which PIM may occur. The processing may involve convolutions of the I and Q channels of the signals. Alternatively, in some embodiments, the frequencies at which significant PIM may occur may be determined by processing power spectral densities (PSD) of signals at one or more frequencies at which the transmitter of the network node transmits. The processing may involve convolutions of the power spectral densities of the transmit signals. Thus, it is possible to find appropriate processing to determine scaling as a function of frequency for any order of PIM.

Figure 3:
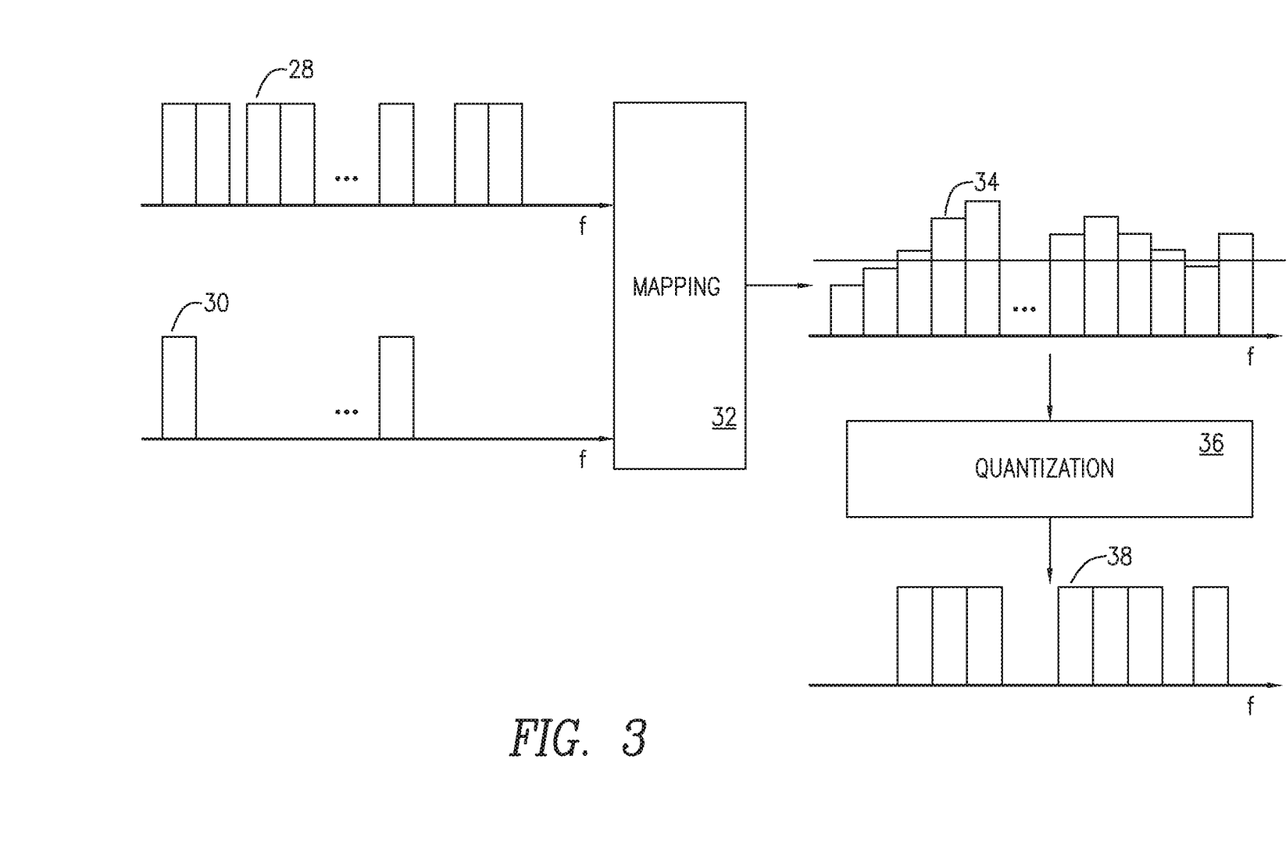
FIG. 3 is an illustration of an exemplary process for determining frequencies at which PIM may occur and determining PIM magnitudes.

FIG. 3 illustrates one exemplary process for determining frequencies at which significant PIM may occur among receiver frequencies of a network node. In the example of FIG. 3, a first set of transmission frequencies, or frequency bins, such as carriers or resource blocks (such as LTE physical resource blocks (PRBs)) having a first set of power spectral densities (PSD) 28 and a second set of transmission frequencies such as carriers or resource blocks having a second set of power spectral densities 30 are assumed to be scheduled for transmission in the same transmission interval. The sources of these power spectral densities may be a transmitter of a single network node or transmitters of a plurality of closely spaced transmitters from different nodes. Thus, it is contemplated that the coordinated link adaptation (CoLA) described herein can be applied to receive signals having PIM arising due to transmissions from a plurality of nearby nodes. In FIG. 3, PSD 28 and 30 are shown as quantized in a two levels and they could, in such case, be associated with DL data on two channels being whether scheduled for transmission or not. However, in alternate embodiments, PSD's 28 and 30 are not quantized, or quantized on more than two levels. A mapping function 32 processes PSD's 28 and 30 of the transmit signals at the first and second transmission frequencies to determine an output PIM power spectral density (PSD) 34 as a function of receive frequency. The mapping function 32 may be implemented by processing circuitry such as a processor and memory where the memory stores programmatic software code that, when executed by the processor, performs the mapping function.

The PIM PSD 34 may be quantized by a quantizer 36 which quantizes the PIM PSD to several levels as a function of receive frequencies. In the example of FIG. 3, the PIM PSD 34 is quantized to two levels as shown in the quantized distribution 38.

In some embodiments, the PIM PSD 34 may be quantized to N levels, where N is greater than two. Where the PIM PSD 34 is quantized to a low value, a determination may be made that PIM at that frequency is not likely to be significant, whereas when the PIM PSD is quantized to a high value, a determination may be made that PIM at that frequency is likely to be significant. Binary quantization may be achieved by comparing the PIM PSD 34 to a threshold at each frequency of the PIM PSD 34.

The mapping function 32 and quantization function 36 may be implemented by processing circuitry in the network node (described below) such as a processor and memory (or some other integrated circuitry) where the memory stores programmatic software code that, when executed by the processor, performs the mapping and quantization functions. The mapping function 32 and quantization function 36 may also be implemented in a server node that receives link adaptation information from a plurality of base stations.

Note that the PIM PSD 34 generally may vary in amplitude which is referred to as scaling. The actual PIM amplitudes received at the receiver at the PIM frequencies to which the receiver of the network node is tuned are based on the PIM channel. If the PIM channel is "clean," e.g., devoid of PIM sources, the actual PIM amplitude at the receiver may be negligible, even though the amplitude of the PIM PSD 34 is not negligible. Note also, that when multiple PIM components of possibly different orders are considered as potentially important to address, the procedure may be generalized by combining, via a weighted sum, the scaling from the multiple PIM components prior to quantizing.

Note also that instead of processing signals in real time to determine PIM PSDs, the PIM PSDs at frequencies among the receive frequencies for a given set of signals at (or signaling activity on) transmit frequencies may be determined in advance and scaling for each PIM PSD receive frequency (or one or more receive frequency bins or resource blocks) may be stored in a look up table (LUT) which is consulted when the PRBs for transmit frequencies are scheduled.

Once the PIM PSDs 34 or 38 versus the receive frequencies are predicted as described above, outer loop link adaptation is employed at at least one frequency at which PIM PSD is predicted among the receive frequencies. Moreover, outer loop link adaptation may be implemented for each level of PIM determined by a multi-level quantization of the PIM power spectral density. For example, outer loop link adaptation may be performed at the base station 16*a* at a frequency at which the PIM is determined to be significant among the base station's receive frequencies. The PIM may be determined to be "significant" if the PIM PSD exceeds a predetermined threshold at that frequency. The adaptation process may include choosing at least one transmission parameter of the transmitter 24 of the wireless device 18*a* to transmit at the at least one frequency at which PIM may occur among the receive frequencies. There may be one outer loop for each of a plurality of frequencies at which the PIM is determined to be significant among the receive frequencies. Further, there may be one outer loop for each PIM level of a frequency at which the PIM is determined to be significant among the receive frequencies. Thus, an outer loop branch for link adaptation could be used when the PIM at a particular frequency is expected to be non-negligible based upon the PIM PSD 34 or quantized PIM PSD 38. Note that this coordinated link adaptation may be based on outer loops at each receive frequency at which PIM is due to just one network node or more than one network nodes.

In the case where the PIM is quantized to a high or low level in a binary quantization, a first link adaptation state exists when high PIM exceeds a threshold, and a second link adaptation state exists when low PIM falls below the threshold. For example, when high PIM is expected, a lower order, i.e., lower resultant bit rate of MCS may be used, whereas when low PIM is expected, a higher order, i.e., higher resultant bit rate, of MCS may be used as compared with one another. In an iterative process, a transmission parameter such as an SINR backoff factor associated with, e.g. used for selecting the MCS, is chosen based on feedback from the wireless device 18*a*. The iterative process desirably converges to a stable state where an optimum MCS is determined. When the first link adaptation state converges to a similar MCS as the second link adaptation state within predefined levels, PIM is determined to be non-significant, and it may be determined that significant PIM inducing elements are absent.

Thus, a difference in SINR offsets between the two loops associated with a prediction of high and low PIM may be indicative of the existence and extent of PIM at a particular frequency. Note also that an expected presence of PIM at a particular frequency may be tested by observing if gain is achieved by implementation of outer loop link adaptation at the particular PIM frequency. A loss that may be associated with outer loop link adaptation when there is actually no PIM is due to loop convergence time where more outer loops result in slower convergence. Once convergence is achieved, it does not matter that significant PIM was not present since an optimal MCS may be determined even in the absence of significant PIM.

It is contemplated that link adaptation based on PIM may be in addition to link adaptation based on interference from a dominant wireless device interferer such as wireless device 18b or 18c. Thus, multiple outer loops may coexist. When binary quantization is used to determine high and low PIM and implement two corresponding loops, the number of loop branches is increased by a factor of two. Embodiments also provide that coordinated outer loop link adaptation may be employed with or without any associated PIM cancellation strategy. Even without an associated PIM cancellation strategy, gain using PIM-aware coordinated link adaptation may be increased.

It is noted that the above embodiments were discussed in the context of outer loop link adaptation. However, rather than capturing SINR offset due to PIM via the outer loop, the PIM channel could be estimated via the inner loop. Further, based on knowledge of frequencies at which PIM may occur among the receive frequencies of the network node, selective allocation of PRBs to particular transmit frequencies may be implemented to limit transmission to transmit frequencies that do not generate as much PIM as other transmit frequencies. To achieve this, the mapping function 32 may be placed within a scheduler of the PIM-aware network node or be in communication with a scheduler of the PIM-aware network node.

Figure 4:
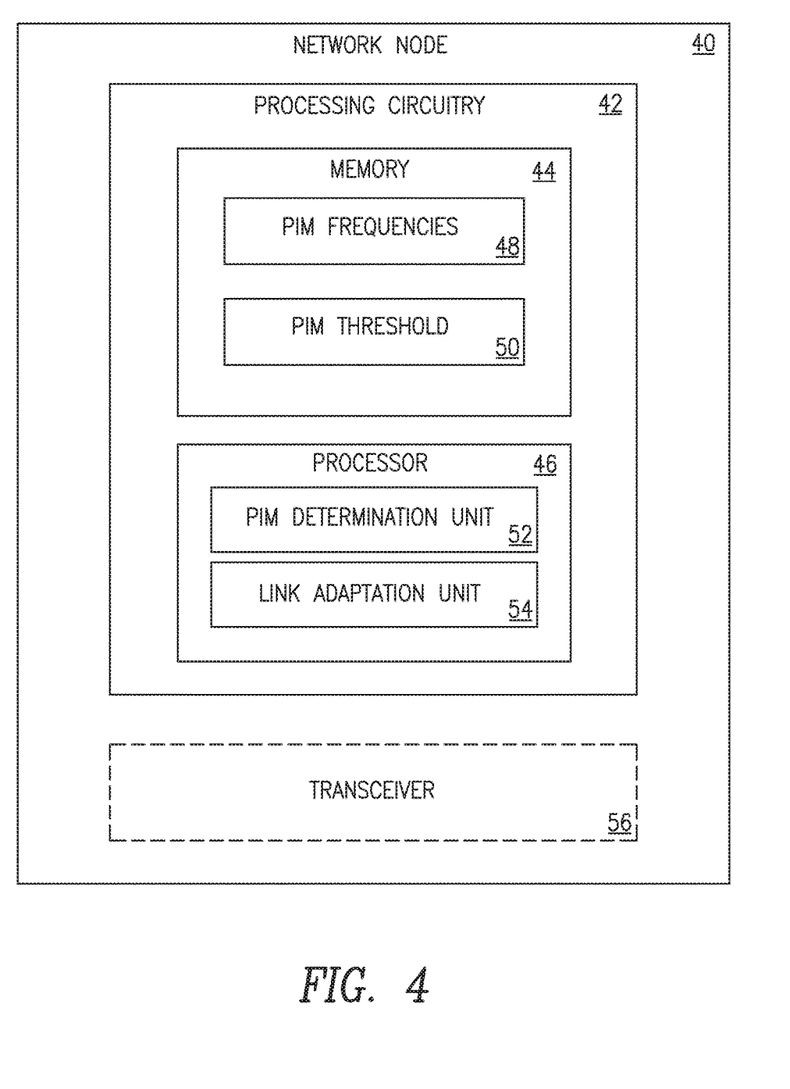
FIG. 4 is a block diagram of a network node configured to implement PIM-aware link adaptation.

FIG. 4 is a block diagram of a network node 40 configured to implement PIM-aware coordinated link adaptation. As noted above, the network node 40 may be a base station 16, wireless device 18 or some other network element, e.g. a server. The network node 40 includes processing circuitry 42 for determining frequencies at which the PIM is determined to be significant among a set of receive frequencies and for performing link adaptation at one or more of the frequencies at which PIM is determined to be significant among the receive frequencies. The processing circuitry 42 may include memory 44 and a processor 46. The memory 44 may contain instructions which, when executed by the processor 46, configure the processor 46 to perform the one or more functions described herein.

In addition to a traditional processor and memory, processing circuitry 42 may comprise integrated circuitry for processing and/or control, e.g., one or more processors and/or processor cores and/or FPGAs (Field Programmable Gate Array) and/or ASICs (Application Specific Integrated Circuitry). Processing circuitry 42 may comprise and/or be connected to and/or be adapted for accessing (e.g., writing to and/or reading from) memory 44, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory).

Such memory 44 may be configured to store code executable by control circuitry and/or other data, e.g., data pertaining to communication, e.g., configuration and/or address data of nodes, etc. Processing circuitry 42 may be adapted to control any of the methods described herein and/or to cause such methods to be performed, e.g., by the node 40. Corresponding instructions may be stored in the memory 44, which may be readable and/or readably connected to the processing circuitry 42. In other words, processing circuitry 42 may include a controller, which may comprise a microprocessor and/or microcontroller and/or FPGA (Field-Programmable Gate Array) device and/or ASIC (Application Specific Integrated Circuit) device. It may be considered that processing circuitry 42 includes or may be connected or connectable to memory, which may be configured to be accessible for reading and/or writing by the controller and/or processing circuitry 42.

The memory 44 is configured to store frequencies 48 at which the PIM PSD is determined by the processor 46 to be significant among the receive frequencies. The memory 44 is also configured to store PIM thresholds 50 used by the processor 46 for PIM PSD quantization in the PIM determination unit 52. The PIM determination unit 52 may, in some embodiments, determine frequencies at which the PIM is determined to be significant based on processing I and Q channels of complex signals at one or more transmit frequencies or by processing power spectral densities of signals at one or more transmit frequencies. The PIM determination unit 52 output may include, in addition to the frequencies at which the PIM is determined to be significant, a quantized predicted PIM amplitude at each such frequency. For example, the PIM determination unit 52 may, in some embodiments, perform the mapping function 32 and the quantization function 36 of FIG. 3. The quantized predicted PIM amplitude at each frequency at which PIM may occur may serve to identify each of a plurality of PIM-aware loops, and may be used to determine a starting point SINR offset for the corresponding outer loop.

Thus, the output of the PIM determination unit 52 may be used by the link adaptation unit 54 to perform coordinated link adaptation at at least one frequency of the PIM PSD among the receive frequencies. Performing the link adaptation includes choosing at least one transmission parameter—such as an SINR backoff factor associated with an MCS or an MCS—of a transmitter of another network node scheduled to transmit at the frequency at which the PIM PSD is determined to be significant.

The transceiver 56 includes a transmitter such as transmitter 20 or 24 and a receiver such as receiver 22 or 26. For example, when the network node is a base station 16a the transmitter 20 may transmit at one or more transmit frequencies that contributes PIM at a receive frequency of the receiver 22. The transmitter 20 transmits an SINR backoff factor associated with an MCS or other transmission parameter to the wireless device 18a to instruct the wireless device to implement the MCS or other transmission parameter via the transmitter 24 of the wireless device 18a. The transceiver 56 is shown in dotted line in FIG. 4 as optional because the network node 40 may not include the wireless portion of the transceiver that may transmit at one or more transmit frequencies that contributes PIM at a receive frequency of the receiver in the case where the network node 40 is a server node that is configured to determine link adaptation parameters. It is understood that, even in the case where the network node is a server node, the network node 40 still includes a transceiver 56 in the general sense to accommodate communications to/from the server node.

Figure 5:
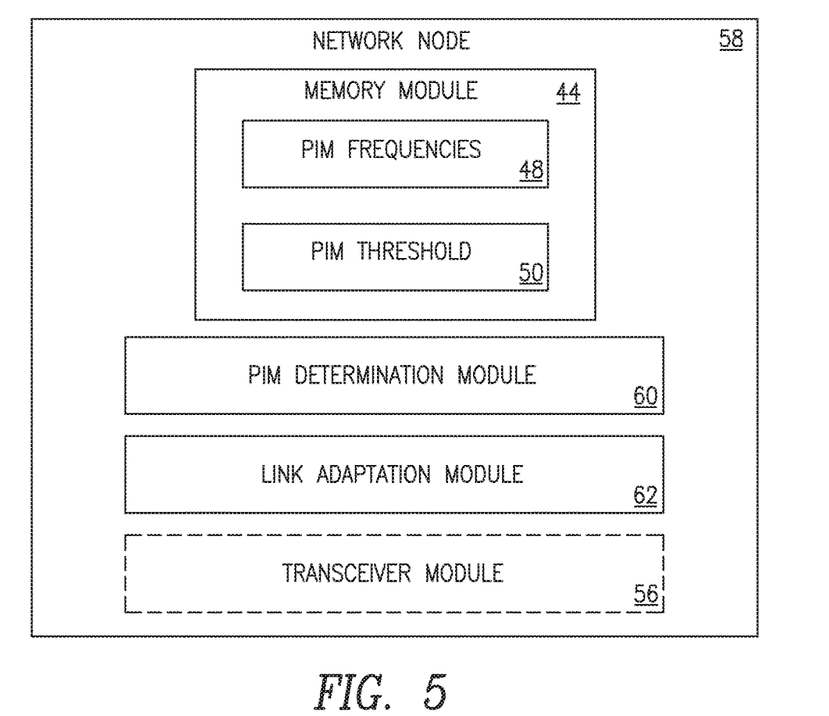
FIG. 5 is a block diagram of an alternative embodiment of a network node configured to implement PIM-aware link adaptation.

FIG. 5 is a block diagram of an alternative embodiment of a network node 58, e.g., a base station 16, a wireless device 18 or other network entity, for implementing PIM-aware coordinated link adaptation. As described above, the memory module 44 is configured to store frequencies 48 at which the PIM PSD is determined to be significant and PIM thresholds 50 used for quantization. The PIM determination module 60 may include the mapping function 32 and the quantization function 36 shown in FIG. 3. The link adaptation module 62 performs the PIM-aware link adaptation described above. The PIM determination module 60 and the link adaptation module 62 may be implemented as software modules that may be executed by a processor to perform the PIM determination and link adaptation functions described herein. The transceiver 56 is shown in dotted line in FIG. 5 as optional because the network node 58 may not include the wireless portion of the transceiver that may transmit at one or more transmit frequencies that contributes PIM at a receive frequency of the receiver in the case where the network node 58 is a server node that is configured to determine link adaptation parameters. It is understood that, even in the case where the network node is a server node, the network node 58 still includes a transceiver 56 in the general sense to accommodate communications to/from the server node.

Figure 6:
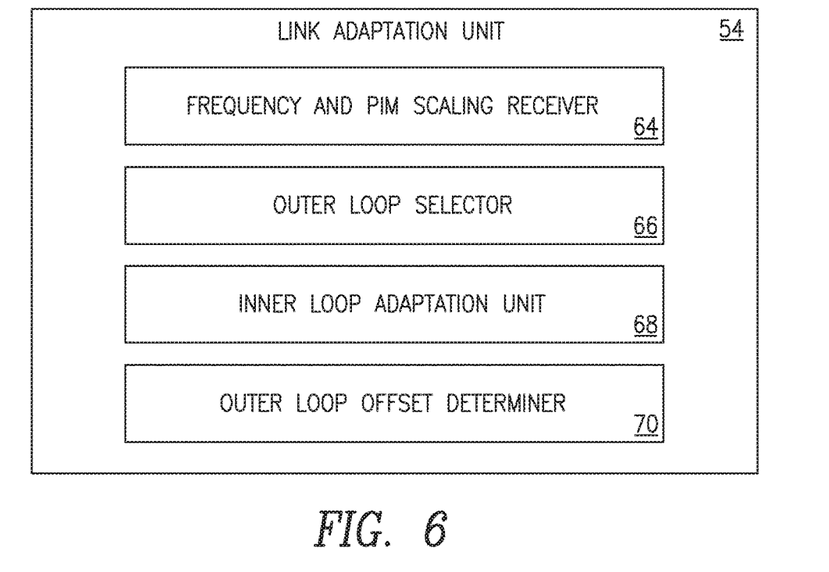
FIG. 6 is a block diagram of a link adaptation unit for performing PIM-aware link adaptation.

FIG. 6 is a block diagram of an exemplary link adaptation unit 54 shown in FIG. 4. The link adaptation unit 54 includes a PIM frequency and PIM scaling receiver 64, which may be implemented as a set of registers that store frequencies at which PIM may occur and predicted PIM amplitudes as these values are determined by the PIM determination unit 52 shown in FIG. 4. An outer loop selector 66 selects one or more PIM-aware outer loops based on the information from the PIM frequency and PIM scaling receiver 64. In some embodiments, the inner loop adaptation unit 68 receives SINR measurements, compares the measurements to thresholds and determines an MCS based on the comparisons.

An outer loop offset determiner 70 determines an offset to the SINR measurement of the inner loop based on feedback from the wireless device 18a, such as acknowledgments and non-acknowledgements. This offset will cause an increase or decrease in the MCS determined by the inner loop. Thus, for example, when a number of non-acknowledgements increases, the offset is adjusted so as to cause a lowering of the MCS to improve throughput by reducing the likelihood of transmission errors. On the other hand, feedback of positive acknowledgement messages notifies the base station of correctly received packets and drives the offset to a more optimistic link adaptation threshold, i.e., MCS with a higher throughput rate, for the inner loop.

Figure 7:
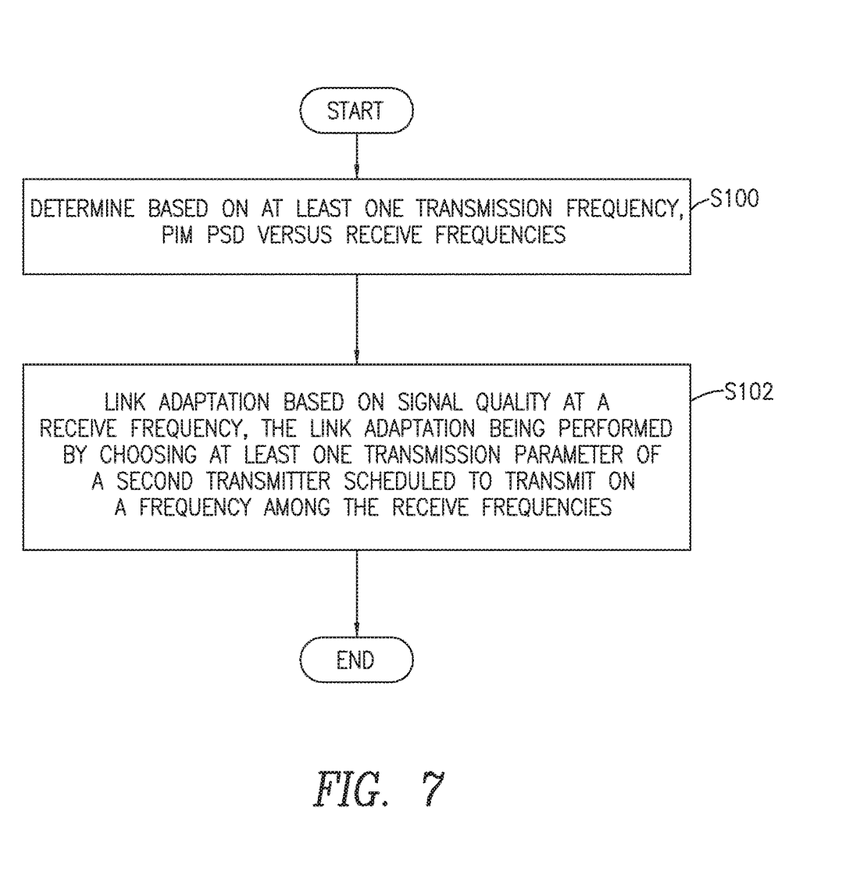
FIG. 7 is a flowchart of an exemplary process for link adaptation that accounts for PIM at a node of a wireless communication system.

FIG. 7 depicts a flowchart of an exemplary process for link adaptation that accounts for PIM at a network node of a wireless communication system, as may be carried out by the network node 40 or 58. The network node may be a base station such as base station 16, a wireless device such as wireless device 18 or other network entity. The network node 40 may have a transceiver 56 having a first transmitter to generate first transmissions at a set of transmission frequencies at at least one antenna and has a receiver configured to receive signals at a set of receiver frequencies. The process includes determining, based on at least one transmission frequency, a PIM PSD versus receive frequencies (block S100). In one embodiment, the function of block S100 may be performed by the PIM determination unit 52.

The process also includes performing a link adaptation based the PIM PSD versus the receive frequencies. Performing the link adaptation includes choosing at least one transmission parameter of a second transmitter scheduled to transmit on a frequency at which PIM may occur (block S102). The function of block S102 may be performed by the link adaptation unit 54. Note that when the network node performing the PIM-aware link adaptation is the base station 16a, the second transmitter is the transmitter of the wireless device 18a. When the network node performing the PIM-aware link adaptation is the wireless device 18a, the second transmitter is the transmitter of the base station 16a.

Figure 8:
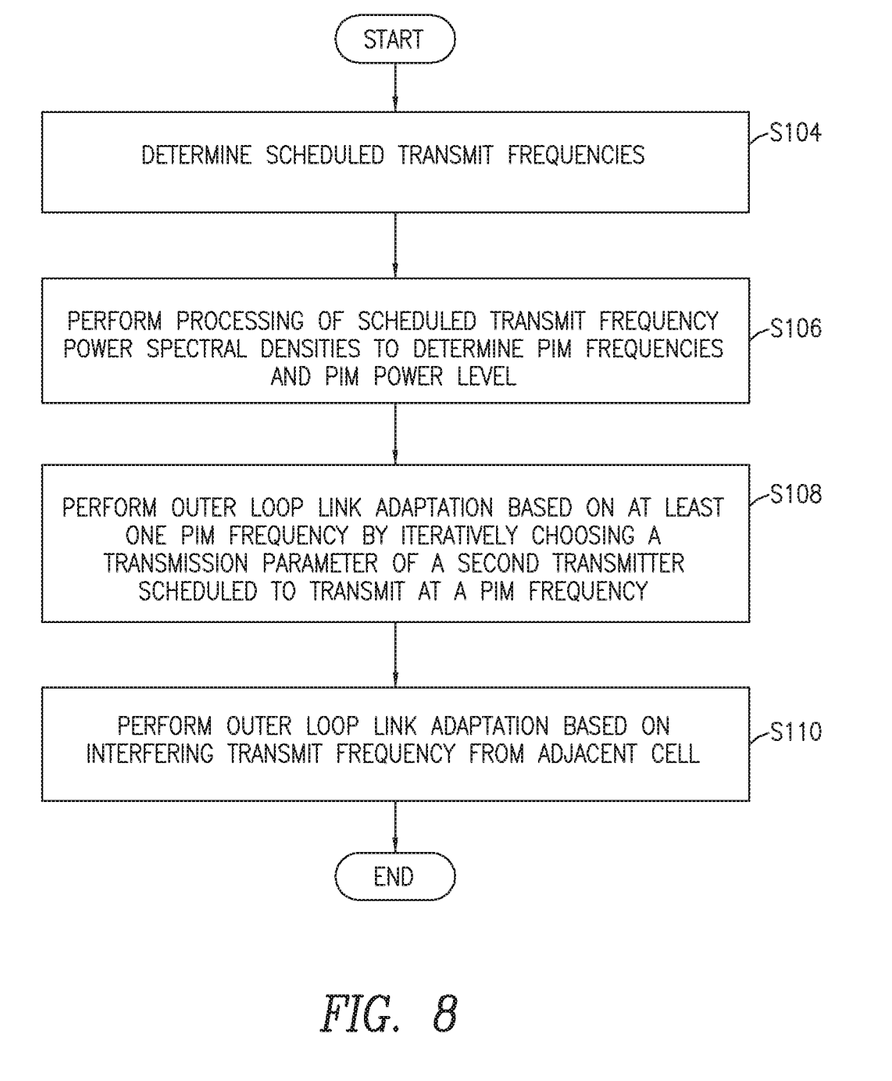
FIG. 8 is a flowchart of an exemplary process for performing PIM-aware link adaptation according to some embodiments described above.

FIG. 8 is a flowchart of an exemplary process for performing PIM-aware link adaptation according to some embodiments described above. The process includes determining scheduled transmit frequencies to be transmitted by the transmitter of the PIM-aware network node, such as the base station 16 (block S104). In this embodiment, the process includes processing of power spectral densities of the transmit frequencies to determine frequencies at which PIM may occur and PIM amplitudes at these frequencies, as described above with reference to the PIM determination unit 52 (block S106). Outer loop link adaptation is performed based on at least one frequency at which the PIM PSD versus the receive frequencies by iteratively choosing a transmission parameter of a second transmitter scheduled to transmit at a PIM frequency, as described above with reference to the link adaption unit 54 (block S108). In some embodiments, in addition to performing PIM-aware outer loop link adaptation, the network node may perform outer loop link adaptation based on an interfering transmit frequency from an adjacent cell or interfering wireless device (block S110). It is noted that the process of FIG. 8 is only one method for performing PIM-aware link adaptation.

Figure 9:
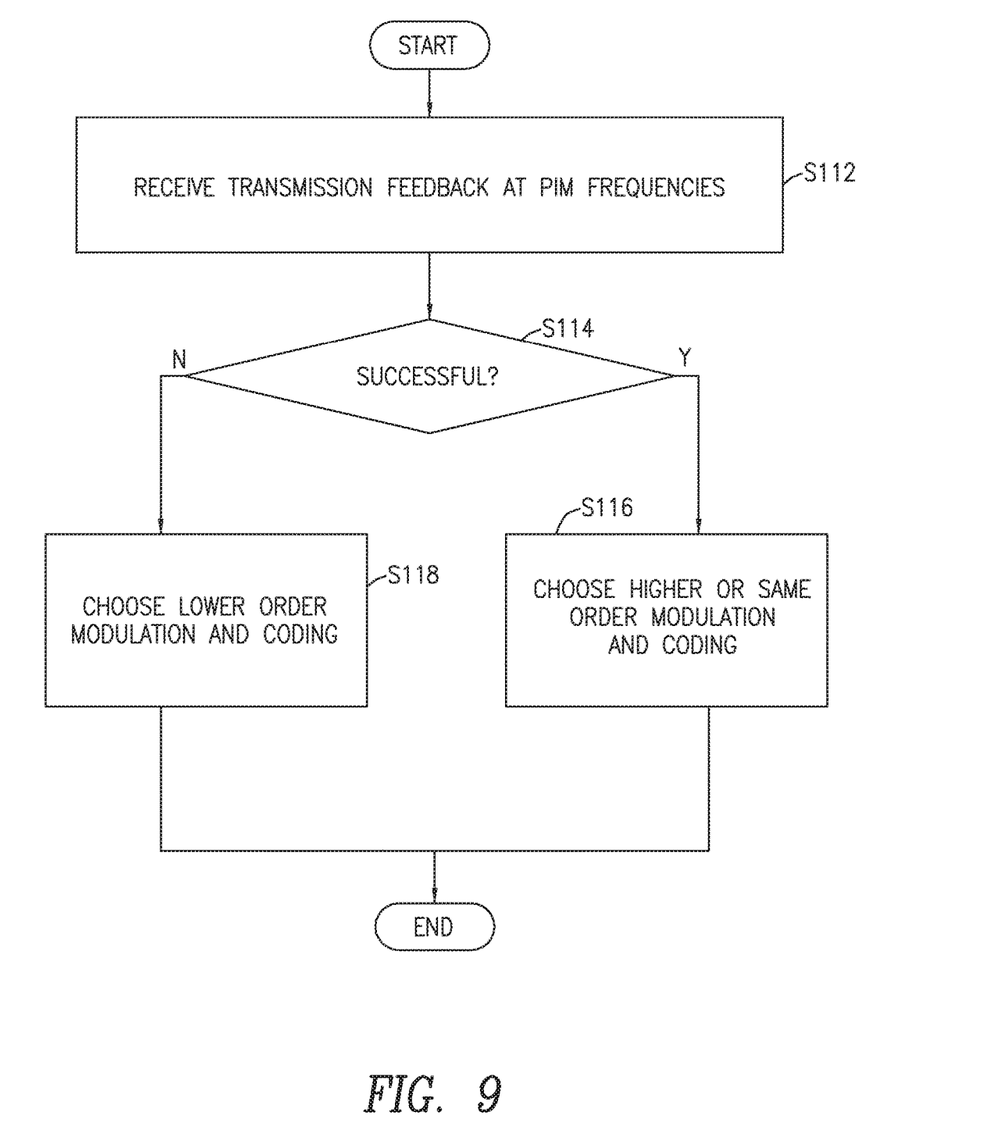
FIG. 9 is a flowchart of an exemplary process for updating a modulation and coding scheme (MCS) based on PIM-aware link adaptation.

FIG. 9 is a flowchart of an exemplary process for updating a modulation and coding scheme (MCS) based on PIM-aware link adaptation. The process includes receiving transmission feedback from a wireless device at a frequency at which the PIM PSD is determined to be significant (block S112). If the feedback indicates that the previous MCS led to a positive acknowledgment from the wireless device (block S114), a higher or same MCS is chosen for the next scheduled transmission from the wireless device (block S116). Otherwise, a lower MCS is chosen (block S118). The MCS may be chosen by the inner loop adaptation unit 68 based on an SINR offset determined by outer loop link adaptation.

By determining frequencies at which PIM PSD is significant based on transmission signals and performing PIM-aware link adaptation at one or more of the determined frequencies among the receive frequencies of the transceiver of the network node, the effects of PIM may be attenuated and the extent of PIM at a particular receive frequency may be determined. Note that the scheduler of the transmission signals may be configured to be PIM aware and thereby avoid scheduling PRBs for transmit frequencies that contribute to significant PIM levels.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method for link adaptation that accounts for passive intermodulation, PIM, at a network node of a wireless communication system, the network node having a first transmitter configured to generate first transmissions at a set of transmission frequencies at at least one antenna and having a receiver configured to receive signals at a set of receive frequencies, the method comprising:
   determining, based on at least one transmission frequency of the set of transmission frequencies at at least one antenna, a PIM power spectral density (PSD) versus the set of receive frequencies; and
   performing link adaptation based on the PIM PSD versus the set of receive frequencies, performing the link adaptation including choosing at least one transmission parameter of a second transmitter scheduled to transmit on a frequency among the set of receive frequencies, a first link adaptation state being based on high PIM exceeding a threshold and a second link adaptation state being based on low PIM falling below the threshold.

2. The method of claim 1, wherein determining the PIM PSD versus the set of receive frequencies is based on processing a power spectral density of at least one of the at least one transmission frequency at the at least one antenna.

3. The method of claim 1, wherein determining the PIM PSD versus the set of receive frequencies is based on processing I and Q signals of at least one of the at least one transmission frequencies.

4. The method of claim 1, wherein the chosen at least one transmission parameter includes a signal to interference plus noise ratio, SINR, back-off factor associated with an order of modulation and coding of a signal at a frequency among the set of receive frequencies.

5. The method of claim 1, wherein determining the PIM PSD versus the set of receive frequencies includes accessing a look up table that maps activity on at least one transmission frequency to a set of pre-calculated PIM levels at the set of receive frequencies.

6. The method of claim 1, wherein determining the PIM PSD versus the set of receive frequencies further comprises determining whether a PIM magnitude at a receive frequency is one of a high PIM exceeding a threshold and a low PIM falling below the threshold.

7. The method of claim 1, wherein significant PIM-inducing elements are determined to be absent when the first link adaptation state converges to a similar transmission parameter as the second link adaptation state.

8. The method of claim 1, wherein determining PIM PSD versus the set of receive frequencies further comprises quantizing a predicted PIM power at a frequency among the set of receive frequencies to one of N levels, N being greater than two.

9. The method of claim 8, further comprising performing a link adaptation for each of the N levels.

10. The method of claim 9, wherein significant PIM-inducing elements are determined to be absent when link adaptation for each of the N levels converge to similar transmission parameters.

11. The method of claim 1, further comprising performing a second link adaptation based on interference from another network node.

12. The method of claim 11, wherein the link adaptation is performed by a link adaptation branch that includes an outer loop link adaptation based on adjusting a target interference plus noise ratio, SINR, based on historical detections of acknowledgments and non-acknowledgements of a receive signal.

13. The method of claim 12, wherein a link adaptation branch includes an inner loop link adaptation based on an estimate of PIM interference in a channel at a receive frequency.

14. A network node configured to perform link adaptation that accounts for passive intermodulation, PIM, the network node having a first transmitter configured to generate first transmissions at a set of transmission frequencies at at least one antenna and having a receiver configured to receive signals at a set of receive frequencies, the network node comprising:
processing circuitry configured to:
determine, based on at least one transmission frequency of the set of transmission frequencies at at least one antenna, a PIM power spectral density, PSD, versus the set of receive frequencies; and
perform link adaptation based on the PIM PSD versus the set of receive frequencies performing the link adaptation including choosing at least one transmission parameter of a second transmitter scheduled to transmit on a frequency among the set of receive frequencies, a first link adaptation state being based on high PIM exceeding a threshold and a second link adaptation state being based on low PIM falling below the threshold.

15. The network node of claim 14, wherein determining the PIM PSD versus the set of receive frequencies is based on processing a power spectral density of at least one of the at least one transmission frequency at the at least one antenna.

16. The network node of claim 14, wherein determining the PIM PSD versus the set of receive frequencies is based on processing I and Q signals of at least one of the at least one transmission frequencies.

17. The network node of claim 14, wherein the chosen at least one transmission parameter includes a signal to interference plus noise, SINR, backoff factor associated with an order of modulation and coding of a signal at a frequency among the set of receive frequencies.

18. The network node of claim 14, wherein determining the PIM PSD versus the set of receive frequencies includes accessing a look up table that maps activity on the at least one transmission frequency to a receive frequency.

19. The network node of claim 14, wherein determining PIM PSD versus the set of receive frequencies further comprises determining whether PIM at a receive frequency is one of high PIM exceeding a threshold and low PIM falling below the threshold.

20. The network node of Claim 14, wherein significant PIM-inducing elements are determined to be absent when the first link adaptation state converges to a similar transmission parameter as the second link adaptation state.

21. The network node of claim 14, wherein determining PIM PSD versus the set of receive frequencies further comprises quantizing a predicted PIM power at a frequency among the set of receive frequencies to one of N levels, N being greater than two.

22. The network node of claim 21, wherein the processing circuitry is further configured to perform a link adaptation for each of the N levels.

23. The network node of claim 14, wherein the processing circuitry is further configured to perform a second link adaptation based on interference from another node.

24. The network node of claim 14, wherein the link adaptation is performed by a link adaptation branch that includes an outer loop link adaptation based on adjusting a target interference plus noise ratio, SINR, based on historical detections of acknowledgements and non-acknowledgements of a receive signal.

25. The network node of claim 14, wherein a link adaptation branch includes an inner loop link adaptation based on an estimate of PIM interference in a channel at a receive frequency.

26. The network node of claim 14, wherein the processing circuitry is further configured to:
determine, based on at least one transmission frequency from another network node, a second PIM PSD versus the set of receive frequencies; and
perform an outer loop link adaptation based on the second PIM PSD.

27. A network node configured to perform link adaptation to compensate for passive intermodulation, PIM, the network node having a first transmitter configured to generate first transmissions at a set of transmission frequencies at at least one antenna and having a receiver configured to receive signals at a set of receive frequencies, the network node comprising:
processing circuitry configured to determine, based on at least one transmission frequency of the set of transmission frequencies, a PIM power spectral density, PSD, versus the set of frequencies; and
processing circuitry configured to perform link adaptation based on the PIM PSD versus the set of receive frequencies, performing the link adaptation including choosing at least one transmission parameter of a second transmitter scheduled to transmit on a frequency among the set of receive frequencies, a first link adaptation state being based on high PIM exceeding a threshold and a second link adaptation state being based on low PIM falling below the threshold.

28. The network node of claim 27, wherein determining PIM PSD versus the set of receive frequencies is based on processing a power spectral density of at least one of the at least one transmission frequency at the at least one antenna.

29. The network node of claim 28, wherein the chosen at least one transmission parameter includes a signal to interference plus noise ratio, SINR, back-off factor associated with an order of modulation of a signal at a frequency at which PIM may occur.

30. The network node of claim 27, wherein determining the PIM PSD versus the set of receive frequencies further comprises determining whether PIM at a frequency among the set of receive frequencies is one of high PIM exceeding a threshold and low PIM falling below the threshold.

31. The network node of claim 27, wherein significant PIM-inducing elements are determined to be absent when the first link adaptation converges to a similar transmission parameter as the second link adaptation.

32. A method for link adaptation using a server node that accounts for passive intermodulation, PIM, at at least one network node of a wireless communication system, the at least one network node having a first transmitter configured to generate transmissions at a first set of frequencies at at least one antenna of the network node, the at least one network node also having a receiver configured to receive signals at a set of receive frequencies, the method comprising using the server node to:
determine, based on at least one transmission frequency of the generated transmission frequencies, a PIM power spectral density, PSD, versus a set of receive frequencies; and
determine link adaptation parameters based on the PIM PSD versus the set of receive frequencies, determining link adaptation parameters including choosing at least one transmission parameter of a second transmitter scheduled to transmit on a frequency among the set of receive frequencies, a first link adaptation state being based on high PIM exceeding a threshold and a second link adaptation state being based on low PIM falling below the threshold.

33. A server node configured to determine link adaptation parameters that account for passive intermodulation, PIM, at at least one network node of a wireless communication system, the at least one network node having a first transmitter configured to generate transmissions at a first set of frequencies at at least one antenna of the network node, the at least one network node also having a receiver configured to receive signals at a set of receive frequencies, the server node comprising:

processing circuitry configured to:
determine, based on at least one transmission frequency of the generated transmission frequencies, a PIM power spectral density, PSD, versus a set of receive frequencies; and
determine link adaptation parameters based on the PIM PSD versus the set of receive frequencies, determining the link adaptation parameters including choosing at least one transmission parameter of a second transmitter scheduled to transmit on a frequency among the set of receive frequencies, a first link adaptation state being based on high PIM exceeding a threshold and a second link adaptation state being based on low PIM falling below the threshold.

* * * * *